United States Patent [19]

Cioci

[11] Patent Number: 4,557,643
[45] Date of Patent: Dec. 10, 1985

[54] DISTRIBUTOR DEVICE FOR DELIVERING COOLANT FROM THE OUTSIDE OF A MACHINE TOOL SPINDLE

[75] Inventor: Sergio Cioci, S. Martino Alla Palma, Italy

[73] Assignee: Baküer Italiana S.p.A., Italy

[21] Appl. No.: 611,409

[22] Filed: May 17, 1984

[30] Foreign Application Priority Data

May 24, 1983 [IT] Italy .................................. 9438 A/83

[51] Int. Cl.⁴ ........................ B23B 27/10; B23B 51/06
[52] U.S. Cl. ..................................... 409/136; 408/56; 408/59; 279/20
[58] Field of Search ....................... 409/234, 135, 136; 408/56, 59; 83/169; 279/1 TS, 20

[56] References Cited

U.S. PATENT DOCUMENTS

| 3,726,363 | 4/1973 | Sussman | 408/56 |
| 3,791,660 | 2/1974 | Bostley | 408/59 |
| 3,893,355 | 7/1975 | Maastricht | 279/1 TS |
| 4,164,879 | 8/1979 | Martin | 408/56 |
| 4,293,251 | 10/1981 | Anderson | 408/59 |
| 4,392,761 | 7/1983 | Eckle | 279/20 |

Primary Examiner—Jimmy C. Peters
Attorney, Agent, or Firm—McGlew and Tuttle

[57] ABSTRACT

A distributor body is idly mounted on the toolholder through rolling bearing means and a connector for feeding coolant even during the rotation; an off-center piston member on the distributor body and with a passage for the coolant is able to match the coolant plug on the machine nose; the piston can slide to engage and respectively disengage the toolholder and the distributor body upon the drawing out and respectively the fitting of the group from and into the machine spindle.

6 Claims, 7 Drawing Figures

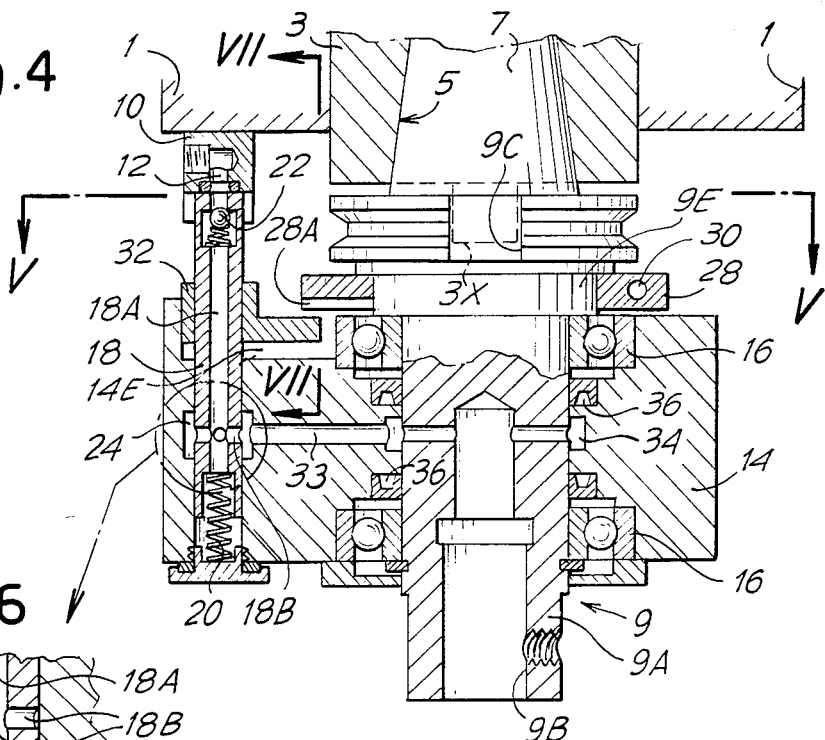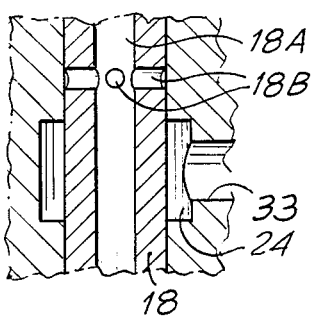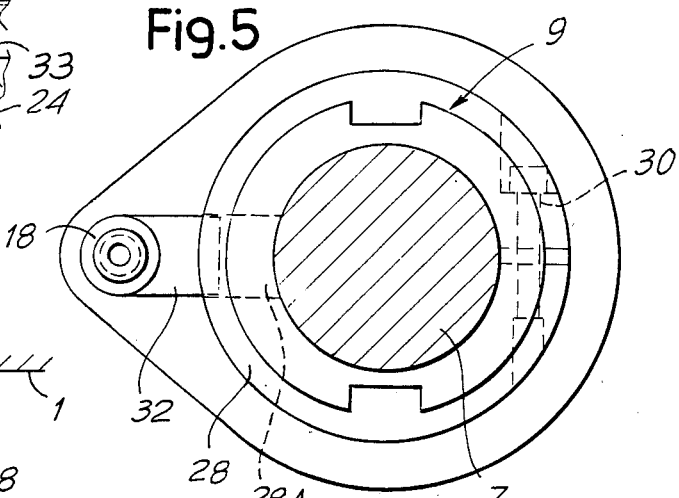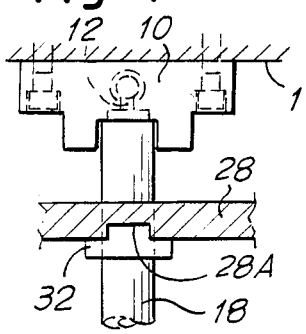

DISTRIBUTOR DEVICE FOR DELIVERING COOLANT FROM THE OUTSIDE OF A MACHINE TOOL SPINDLE

BACKGROUND OF THE INVENTION

The peculiar characteristic of the numerical-control machines and machining centers is the automatic replacement of the toolholder picked up from proper stores by means of an automatic arm driven by the control unit. When particular types of tools are used which need—for their good efficiency—an intense and concentrated cooling action, there exists the problem of how to feed the coolant by automatic connection to an external plug but located near the machine spindle.

SUMMARY OF THE INVENTION

The invention relates to a device which carries out the automatic coupling of a coolant-delivery means together with the automatic mounting of a toolholder.

Substantially, the device according to the invention—for distributing the cooling liquid from the outside of a replaceable toolholder in a numerical-control machine tool or a machining center or the like, through a coolant plug in angular position and pre-determined center distance on the machine nose—comprises in combination:

a distributor body idly mounted on the toolholder through rolling bearing means and a connector for the feeding of coolant even during the rotation;

an off-center piston member on the distributor body with a passage for the coolant, able to match a coolant plug on the machine nose;

and means to engage and respectively disengage the toolholder and the distributor body upon the drawing out and respectively the fitting of the group from and into the machine spindle.

In one practical embodiment of the invention, the piston member is able to slide axially and is urged by resilient means into an angular restraint position between a tooth of it and a seat carried by the toolholder equipment (or viceversa), in order to define a univocal mutual angular position. When fitting the toolholder on the spindle, said piston withdraws, against the action of the resilient means, and the piston matches in a sealing way the coolant plug on the machine nose; moreover, the tooth and the seat disengage for free rotation.

The angular restraint, formed between the piston and the toolholder by means of said tooth and said seat, is adjustable by angular adjustment and screw-forced blocking of a ring on the toolholder; the adaptability is obtained in this way to different kinds of machines.

The piston may present a passage for the cooling liquid, with check valve and with the possibility to perform a plugging by axial sliding between radial passages in the piston and an outer manifold (or viceversa).

BRIEF DESCRIPTION OF THE DRAWINGS

The invention will be better understood by a reading of the following description and the accompanying drawing, which shows a practical non-limitative exemplification of the invention itself. In the drawing:

FIG. 4 is an axial section of the toolholder;

FIG. 5 is a cross-section taken on line V—V of FIG. 4;

FIG. 6 shows a circled area of FIG. 4 on an enlarged scale; and

FIG. 7 is a view taken on line VII—VII of FIG. 4.

DESCRIPTION OF A PREFERRED EMBODIMENT

Figure 1:
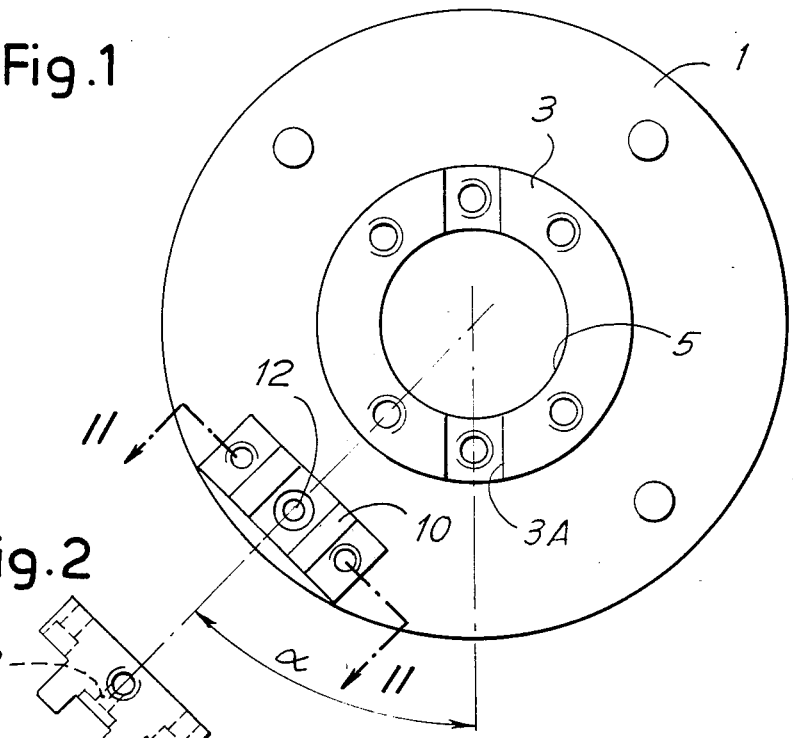
FIGS. 1 and 2 show a front view and a section view on line II—II of FIG. 1 of a machine spindle.

As a general description of the illustrated group, by 1 there is indicated the machine structure around the spindle 3 rotating with the seat 5 for the conical shank 7 of the toolholder head 9 which is driven by the notches 3A and 9C and by a small block 3X. By 10 there is indicated a connector for the coolant developed like a fork about the delivery hole 12. By 9A there is indicated the protruding cylindrical part of the toolholder 9, with the seat 9B for the tool U. Every machine may present a characteristic angle $\alpha$ ("stop-point" angle) between the plug 10–12 and the radial axis of the spindle orientation 3, 5 and of the driving notches 3A, in the programmed stopping conditions.

Figure 2:
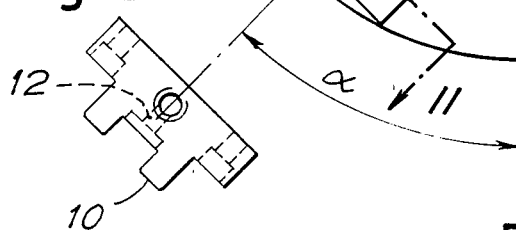
Figure 3:
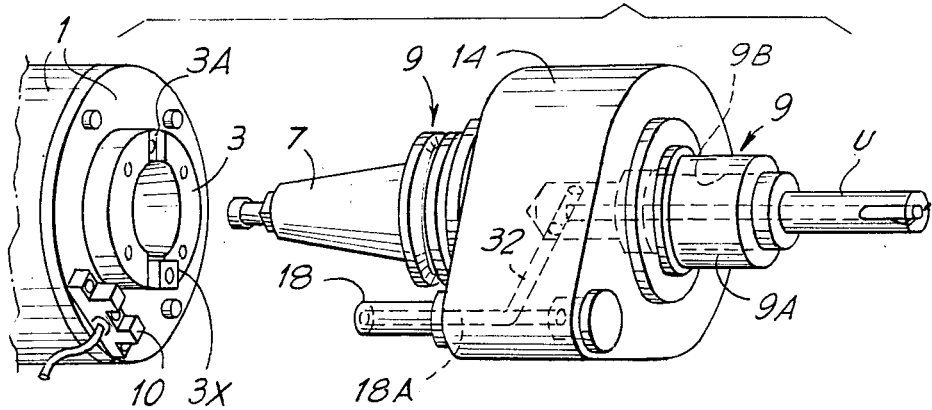
FIG. 3 shows in perspective view a spindle of a headstock with plug for the delivery of the cooling liquid and a toolholder (with inserted tool), achieved according to the invention.

In FIGS. 1 and 2, one of the most usual cases is shown of the coolant plug arrangement with respect to the machine nose.

To solve the problem, according to the invention, the toolholder has been equipped with a suitable distributor 14—rotating with respect to the body 9 through bearings 16—on which a retractable piston 18 is mounted, with a center distance equal to the one of hole 12 with respect to the rotation axis. Said piston has the triple purpose: (1) to act as a stop means to prevent the rotation of the body; (2) to act as a connector for the coolant plug; and (3) to act as a means for orientation between its position and the cone driving notches 3A, 9C.

The stop for preventing the rotation of the body 14 in order that this might rotate idly around the toolholder 9, 9A, takes place by the engagement of the retractable piston 18 with coolant fork-shaped plug 10 which, owing to its fork shape (shown in rotated position in FIG. 4 to make the illustrated details in the drawing clearer)—once the coupling has taken place—makes the position of the distributor relative to the machine univocal. The piston 18 serves as a connector, to permit the passage of the coolant inside the distributor, because the piston itself—by engagement into the fork-like plug 10—comes to lay with its flat end against a toric gasket housed around the hole 12 (or viceversa), in such a way that—the moment the coolant flow is started—a perfect seal takes place, in the presence of a spring 20 which urges the piston 18 thus ensuring a pressure sufficient to avoid leaks and liquid dispersions. The coolant under pressure opens a check valve 22 located on top of piston 18 and goes into an axial hole 18A and reaches, via suitable radial holes 18B, a manifold 24 formed in the body of the distributor 14.

In order to carry out the piston orientation upon change of angle $\alpha$, it is found that, according to the different kind of machine, the position of the coolant fork-shaped plug 10 may have a different angular ($\alpha$) orientation with respect to driving notches 3A, 9C of the spindle 3. When the automatic arm of the machining center, after taking out the toolholder 9 from the store, brings it in front of the machine nose to insert it into the spindle 3, it is necessary to have such an orientation as to engage both the driving grooves or notches 3A, 9C and the retractable piston 18 into the fork-shaped seat of the coolant plug 10. The orientation system devised for this distributor is of universal kind and thus able to be mounted on any kind of machine whatever the angle α of "stop-point" may be, provided the center distance between the machine axis and the coolant connector is equal to that of the distributor. For this purpose, a ring 28 for orientation (indexing) is provided which may be engaged to a cylindrical hub 9E of the toolholder 9, located adjacent to the fitting cone flange 7, and on which hub, one of the bearings 16, 16 of the distributor 14 comes to rest, thus assuming an intermediate position in the distributor group. The ring 28 may be angularly adjusted on the hub 9E over 360 degrees, so as to allow a notch 28A, radially formed on its lower face (see FIG. 4), to assume any angular position with respect to the notches 9C which drive the fitting cone flange 7. Once reached the angle α of desired "stop-point", the ring 28 is tightened by a tangential collet locking screw 30 in the selected position on the surface 9E, thus rendering univocal the orientation between the ring 28 with notch 28A and the cone 7. A catch 32 carried by the piston 18, may take seat in the notch 28A of the orientation ring 28, being urged thereto by the spring 20 which acts on the retractable piston 18. The catch 32 is integral with the piston 18 and projects laterally therefrom to house in a seat 14E formed on the body of the distributor 14, so that this body becomes univocal—for angular position—with respect to the catch 32. In the position the catch 32 is fitted into seat 28A of the orientation ring 28, the toolholder and the distributor will be in phase and ready to be mounted on the machine spindle.

When the automatic arm performs the mounting of the toolholder 9, 14, the moment the cone 7 lays on its seat 5, the retractable piston 18 bears on the coolant connector 10, 12, thus establishing the connection with the machine power network and, at the same time, causing the rotation of distributor 14 to stop, still due to the engagement between the piston and the connector. With the approach of the toolholder 9 to the group 1, 3, the piston withdraws, disengaging in this way the catch 32 from the notch 28A of the orientation ring 28, and allowing the toolholder to rotate.

After the work has been accomplished, the machine spindle stops in the "stop-point" position, and the automatic arm disengages the toolholder in a determined angular position and moves it away releasing the retractable piston 18 which disconnects itself from the coolant connector 10, 12 and comes to protrude to a greater extent dragging along with it the catch 32 which goes into engagement with the notch 28A of the orientation ring 28, blocking angularly the distributor body 14 and the toolholder 9 thus assuring their angular phase. The toolholder is then put again in store ready to be reassembled on the machine.

The feeding of the coolant from the connector 10, 12 takes place through the valve 22, the passage 18A, the manifold 24, a passage 33 and a manifold 34 in the through-seat formed in the body 14 via the shank 9A of the toolholder 9. The nonreturn valve 22, with unidirectional flow, is to prevent the liquid remained inside the toolholder from coming out upon the removing of the toolholder from the machine nose.

The distributor 14 is mounted at the end (cylindrical 9A, in the example) of the body 9 integral with the fitting cone 7 of the machine, in which end 9 the tool seat 9B is formed (in FIG. 4 a cylindrical fitting has been shown, but a conical Morse fitting or other may be provided). The mounting is performed with the two ball bearings 16 having the purpose to carry and support the body 14 of the distributor which may thus rotate idly and may be prevented from rotating during rotation of body 9, 9A. Between the bearings 16 two gaskets 36 are housed, made of a special elastomer which permits even heavy working conditions for sliding-type dynamic seal. Between the two gaskets 36 a collecting annular chamber including the groove 34 is provided which the conduit 33—for the feed of the coolant coming from the passage defined by 12, 22, 18A, 24 of the retractable piston 18—gets into.

The piston 18, in addition to the mechanic functions for positioning and for angular restraint, has, therefore, also the functions of a hydraulic device, that is, of a connector for the flow intake, and, moreover, has the function to permit a unidirectional flow owing to the suitable built-in valve 22. As it can be seen from the detail of FIG. 6, when the piston projects in a rest position with catch 32 in the seat 28A, the radial holes 18B are closed owing to their phase displacement with respect to the groove 24 and plugged by the cylindrical coupling of piston 18 with its seat. The moment the piston 18 moves into abutment at 12 and against the action of the spring 20, the holes 18B become lined up with the annular chamber resuming in this way the circuit connection for the coolant to go inside the rotating distributor and from this, via the tool U, to reach the working zone where the cutting edge operates.

It should be understood that the drawing shows an exemplification given only as a practical demonstration of the invention, as the invention itself may vary in the forms and dispositions without, nevertheless, coming out from the ambit of the idea on which it is based.

What is claimed is:

1. An automatic machine tool with tool holder and distributor for cooling liquid comprising:

a machine structure (1);

a spindle (3) mounted for rotation on said structure about a central axis, said spindle forming a conical seat (5) for a conical shank;

a toolholder head (9) with a conical shank (7) for engagement in said conical seat of said spindle, said head having a collar with a notch (9C) for engagement with a portion of said spindle for fixing a rotational position between said head and said spindle;

a distributor (14) mounted for free rotation on said head about said central axis with said conical shank (7) engaged in said conical seat (5), said distributor including a passage (33, 34) for coolant to an interior (9B) of said head (9);

a retractable piston (18) with an axial passage (18A) parallel to said central axis, mounted for sliding on said distributor in a direction parallel to said central axis and at a position radially spaced from said central axis with said conical shank (7) engaged with said conical seat (5), said retractible piston having an end with an opening communicating with said axial passage (18A) facing said machine structure (1);

biasing means in said distributor and engaged with said retractable piston (18) for biasing said retractible piston toward said machine structure (1);

said axial passage (18A) of said retractible piston communicating with said passage (33,34) of said distributor in at least one position of said retractible piston (18) with respect to said distributor (14);

a ring (28) connected to said head (9) and having a seat (28A) therein;

a catch (32) mounted on said retractible piston (18) at a location outside said distributor (14), said catch being shaped to engage in said seat (28A) of said ring (28) by the influence of said biasing means for fixing a rotational position between said distributor and said head when said piston is out of engagement with said plug, said catch being out of engagement with said seat (28A) when said piston is in engagement with said plug; and a fork-shaped plug (10,12) fixed to said machine structure (1) radially spaced from said central axis and at a selected rotational position around said central axis, said retractible piston (18) being positioned at an equal radial distance from said central axis as said fork-shaped plug so that said end of said piston engages with said fork-shaped plug, said fork-shaped plug including an opening for coolant and for supplying coolant to said axial passage (18A) of said retractible piston (18) with said conical shank (7) engaged with said conical seat (5), said axial passage of said piston communicating with said passage of said distributor when said end of said piston is engaged with said fork-shaped plug.

2. An automatic machine tool according to claim 1, including adjustable mounting means connected between said ring (28) and said head (9) for adjusting a fixed rotational position between said ring and said head to establish correct alignment between said retractible piston (18) and said fork-shaped plug (10,12).

3. An automatic machine tool according to claim 2, wherein said retractible piston (18) has radial openings communicating with said axial passage (18a) thereof, said passage of said distributor including a manifold (24) communicating with said radial openings with said piston engaged with said plug, said piston being moved by said biasing means into a position blocking communication between said radial passages and said manifold (24) when said piston is not engaged with said plug.

4. An automatic machine tool according to claim 1, including a check valve (22) in said axial passage (18A) of said piston (18) for permitting flow of coolant into said axial passage only.

5. An automatic machine tool according to claim 3, including a check valve (22) in said axial passage (18A) of said piston (18) for permitting flow fo coolant into said axial passage only.

6. An automatic machine tool with tool holder and distributor for cooling liquid comprising:

a machine structure (1);

a spindle (3) mounted for rotation on said structure about a central axis, said sprindle forming a conical seat (5) for a conical shank;

a toolholder head (9) with a conical shank (7) for engagement in said conical seat of said spindle, said head having a collar with a notch (9C) for engagement with a portion of said spindle for fixing a rotatinal position between said head and said spindle;

a distributor (14) mounted for free rotation on said head about said central axis with said conical shank (7) engaged in said conical seat (5), said distributor including a passage (33, 34) for coolant to an interior (9B) of said head (9);

a retractible piston (18) with an axial passage (18A) parallel to said central axis, mounted for sliding on said distributor in a direction parallel to said central axis and at a position radially spaced from said central axis with said conical shank (7) engaged with said conical seat (5), said retractible piston having an end with an opening communicating with said axial pasage (18A) facing said machine structure (1);

biasing means in said distributor and engaged with said retractible piston (18) for biasing said retractible piston toward said machine structure (1);

said axial passage (18A) of said retractible piston communicating with said passage (33, 34) of said distributor in at least one position of said retractible piston (18) with respect to said distributor (14);

a ring (28) connected to said head (9) and having a seat (28A) therein;

a catch (32) mounted for rotation with said distributor (14) and for sliding motion parallel to siad central axis, said catch being shaped to engage in said seat (28A) of said ring (28) by the influence of said biasing means for fixing a rotational position between said distributor and said head when said piston is out of engagement with said plug, said catch being out of engagement with said seat (28A) when said piston is in engagement with said plug; and a fork-shaped plug (10,12) fixed to said machine structure (1) radially spaced from said central axis and at a selected rotational position around said central axis, said retractible piston (18) being positioned at an equal radial distance from said central axis as said fork-shaped plug so that said end of said piston engaged with said fork-shaped plug, said fork-shaped plug including an opening for coolant and for supplying coolant to said axial passage (18A) of said retractible piston (18) with said conical shank (7) engaged with said conical seat (5), said axial passage of said piston communicating with said pasage of said distributor when said end of said piston is engaged with said fork-shaped plug.

* * * * *